United States Patent [19]

Denman

[11] 4,342,368
[45] Aug. 3, 1982

[54] ROTARY DRILLS AND DRILL BITS

[75] Inventor: Dennis Denman, Retford, England

[73] Assignee: Kennametal Inc., Latrobe, Pa.

[21] Appl. No.: 214,668

[22] Filed: Dec. 8, 1980

Related U.S. Application Data

[63] Continuation of Ser. No. 934,875, Aug. 17, 1978, abandoned.

[30] Foreign Application Priority Data

Aug. 18, 1977 [GB] United Kingdom ............... 34758/77

[51] Int. Cl.³ .......................................... E21B 10/46
[52] U.S. Cl. .................................... 175/410; 175/415
[58] Field of Search .................. 175/57, 392, 409–421, 175/397–398

[56] References Cited

U.S. PATENT DOCUMENTS

| | | | |
|---|---|---|---|
| 1,737,495 | 11/1929 | Feldman | 175/395 |
| 1,845,168 | 2/1932 | McHaley | 175/421 |
| 1,895,205 | 1/1933 | Prior | 175/421 |
| 2,756,967 | 7/1956 | Meutsch | 175/410 |
| 3,595,327 | 7/1971 | Self | 175/410 |
| 4,026,372 | 5/1977 | Hampson | 175/410 |

FOREIGN PATENT DOCUMENTS 600276 7/1934 Fed. Rep. of Germany ...... 175/410

*Primary Examiner*—William F. Pate, III
*Attorney, Agent, or Firm*—Lawrence R. Burns

[57] ABSTRACT

A rotary drill bit, or a drill tip for use in such a drill bit, has a cutting edge extending outwardly away from the axis of rotation of the bit and defined by the intersection of a frontal face, inclined with respect to a plane normal to the axis of rotation of the bit, and a leading face, inclined with respect to a plane containing the axis of rotation of the bit, the angles which said frontal and leading faces make with said planes respectively both decreasing as said faces extend away from the axis of rotation of the bit. The decrease in the angles is such that the included angle between the frontal face and the leading face, the clearance angle and the effective rake each remain substantially the same at all points along the length of the cutting edge.

6 Claims, 45 Drawing Figures

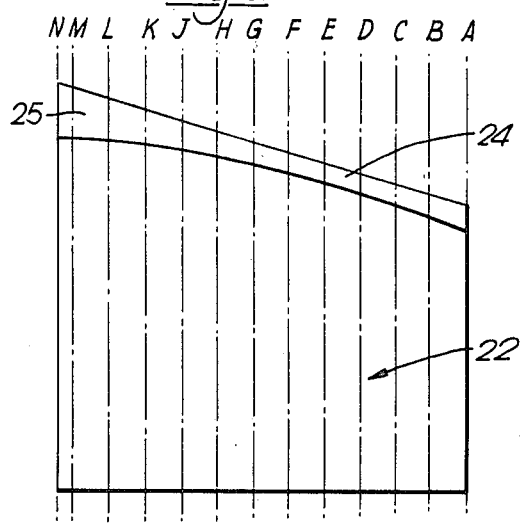
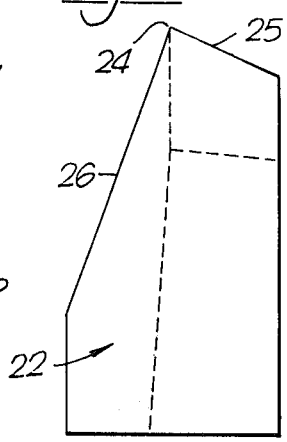
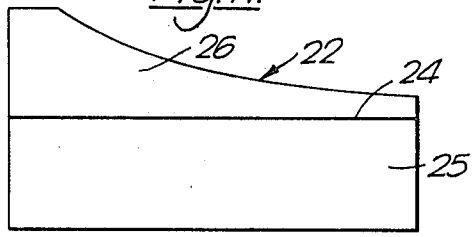
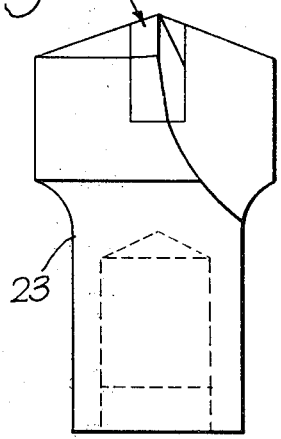
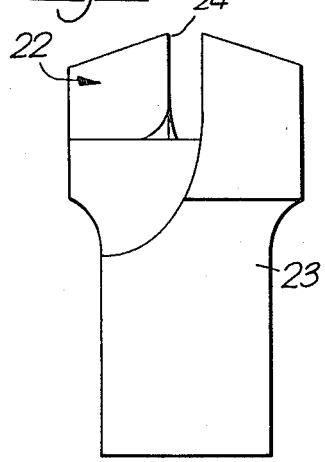
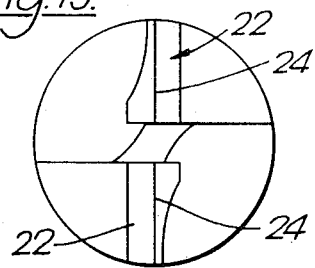

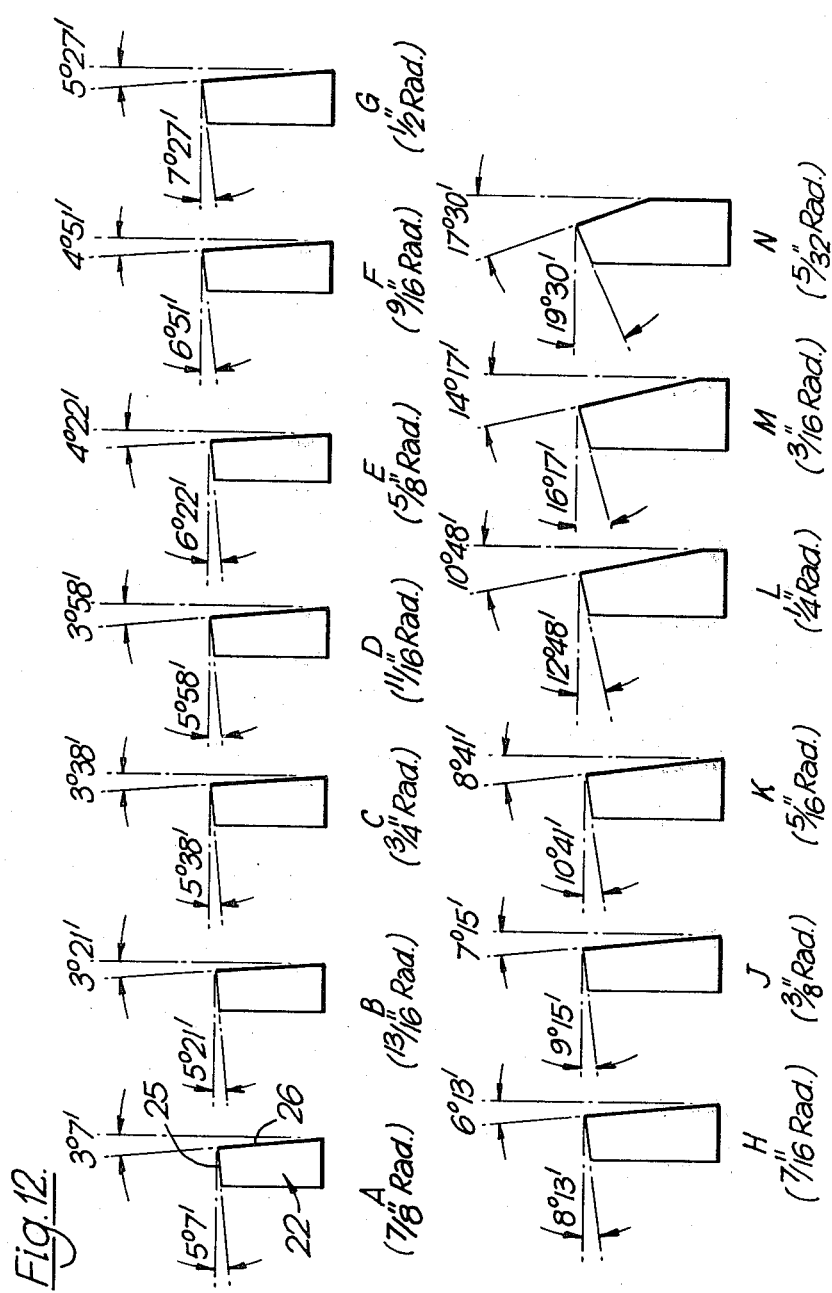

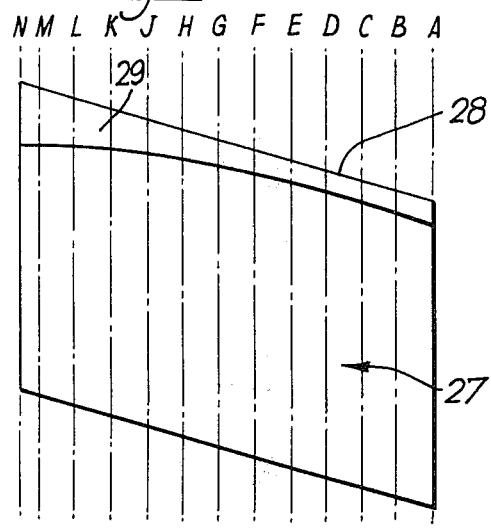
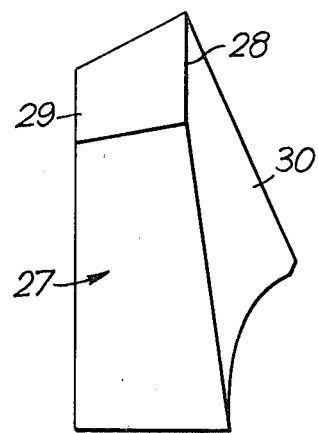
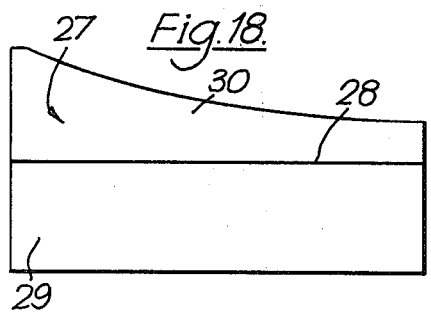
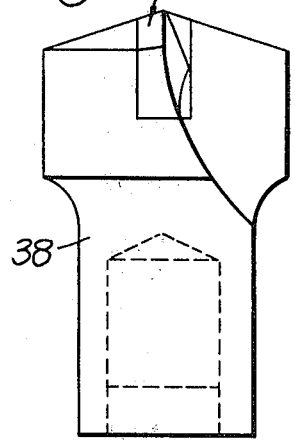
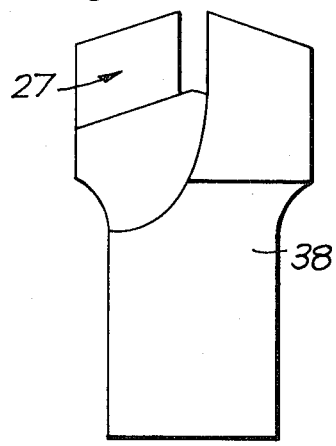
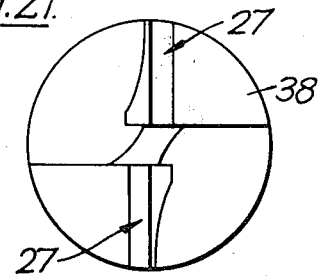

ROTARY DRILLS AND DRILL BITS

This is a continuation of application Ser. No. 934,875, filed Aug. 17, 1978, abandoned.

BACKGROUND OF THE INVENTION

This invention relates to rotary drills and drill bits and has been developed in relation to machinedriven rotary and rotary percussive drills for rock drilling although it has other applications.

Drill bits originally designed for use with hand-held rotary drills, have radially extending and axially inclined cutting edges formed by intersecting leading and frontal faces at the tip of the bit, the leading face being that face which is inclined at a small angle to a plane containing the axis of rotation of the bit, and the frontal face being that face which is inclined at a small angle to a plane normal to the axis of rotation of the bit. When such drill bits are power driven by high-thrust, high-torque machines, the drilling is more effective and harder rock can be drilled but failures tend to occur because neither the drill bit nor the associated drilling rod has adequate strength even when of high grade material.

The present invention aims to improve the strength of drills and drill bits for heavy duty and particularly for high torque drive.

Alternative to rotary drilling, there is the technique of percussive drilling, wherein chisel bits or cross bits are used with a machine which withdraws the bit from the work face between each blow, the axial movement being used to index the bit angularly.

The present invention is not concerned with such percussive indexing techniques but it does have important application in rotary drilling machines of high thrust and torque and in which a percussive action is introduced. This percussive action is very different from percussive indexing, in that the bit is not withdrawn from the work face between blows and the relatively fast rotation and high thrust is continuously maintained during drilling. The rotary percussive drilling machine may employ a percussive vibration of high frequency and low energy or of low frequency and high energy. Such machines impose still greater stresses on the drill bit and existing standard drill bits are inadequate.

SUMMARY OF THE INVENTION

According to the invention there is provided a rotary drill bit having a cutting edge extending outwardly away from the axis of rotation of the bit and defined by the intersection of a frontal face, inclined with respect to a plane normal to the axis of rotation of the bit, and a leading face, inclined with respect to a plane containing the axis of rotation of the bit, the angles which said frontal and leading faces make with said planes respectively both decreasing as said faces extend away from the axis of rotation of the bit.

BRIEF DESCRIPTION OF THE DRAWINGS

FIG. 9 is a side elevation of a drill tip for use in a drill bit employing two similar tips, FIG. 10 is an end elevation of the drill tip of FIG. 9, FIG. 11 is a plan view of the drill tip of FIG. 9, FIG. 12 are sectional views of the drill tip of FIG. 9 at thirteen different points along the length of the cutting edge.

FIGS. 13 and 14 are side views of a rotary drill bit incorporating two of the drill tips of FIGS. 9 to 12, FIG. 15 is an end elevation of the drill bit of FIGS. 13 and 14.

FIGS. 16 to 18 are similar views to FIGS. 9 to 11 of an alternative form of drill tip, and FIGS. 19 to 21 are similar views to FIGS. 13 to 15 of a drill bit incorporating the drill tip of FIGS. 16 to 18.

DESCRIPTION OF THE PREFERRED EMBODIMENTS

The considerations underlying the invention will first be explained with reference to FIGS. 1 to 3.

When a conventional rotary drill bit is in use, the tip with a radially extending cutting edge sweeps round the axis and also advances axially of the bit into the workface. In the case of a drill bit driven to have a drilling rate of 10 feet per minute when running at 400 rpm, the penetration per revolution is 0.3 inch. Each point along the cutting edge, at a radial distance r from the rotational axis, advances 0.3 inch in one revolution or $2\pi r$ inches, and so the gradient of the path, known as the "penetration angle", depends on the radial distance of the point from the rotational axis. Specifically, for a drill bit of $1\frac{3}{4}$ inch diameter having the speed and drilling rate mentioned above, the tangent of the penetration angle is $0.3/2\pi r$ and thus this angle changes progressively, from 3° 7' at the outer end of the cutting edge to 14° 17' at a radius of 3/16 inch.

Figure 1:
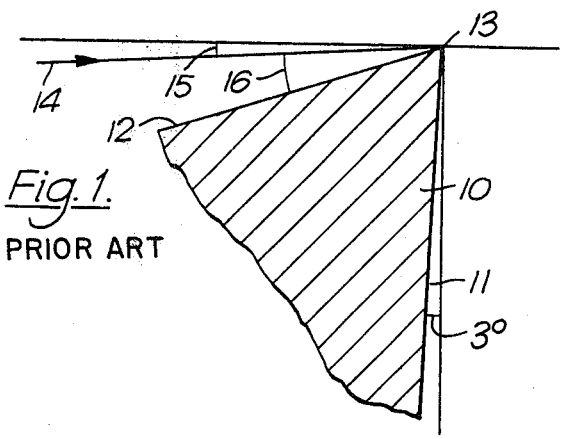
FIGS. 1 to 3 are cross-sections at different points along the length of the cutting edge of a conventional rotary drill bit, illustrating diagrammatically the different penetration and clearance angles at those points.
Figure 2:
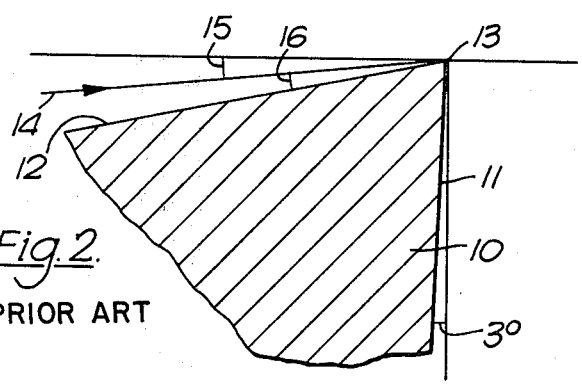
Figure 3:
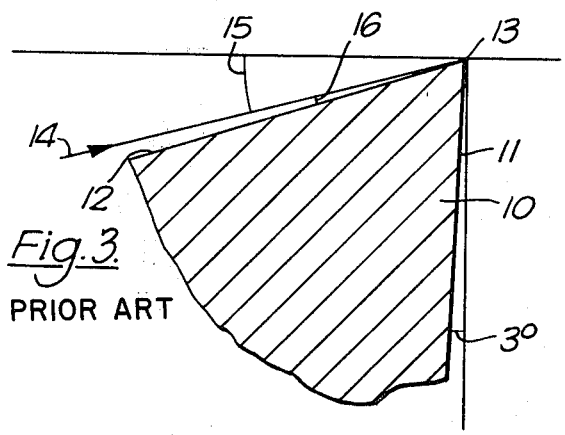
Figure 4:
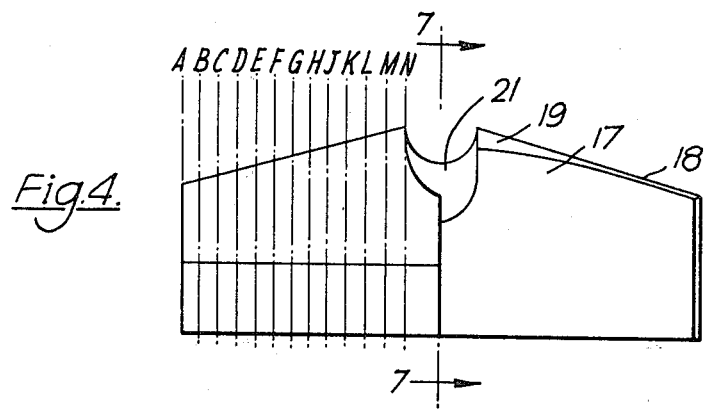
FIG. 4 is a side elevation of a one-piece drill tip of a drill bit according to the invention.
Figure 5:
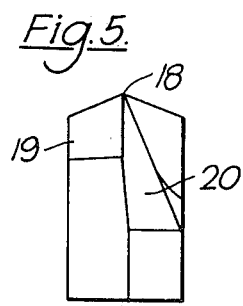
FIG. 5 is an end elevation of the drill tip of FIG. 4.
Figure 6:
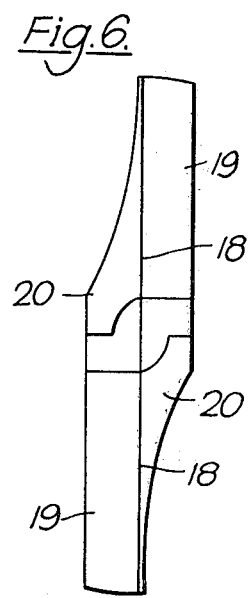
FIG. 6 is a plan view of the drill tip of FIG. 4.
Figure 7:
FIG. 7 is a section on line 7—7 of FIG. 4, FIG. 8 are sectional views of the drill tip of FIG. 4 at thirteen different points along the length of the cutting edge, showing the different angles of inclination of the leading and frontal faces at those points.

FIGS. 1 to 3 represent diagrammatically a prior art drill tip 10 in position against a workface and having an included angle of 70°. The leading face 11 of the tip is inclined at 3° with respect to the axis of rotation of the drill bit, and the frontal face 12 is inclined at 17° with respect to a plane normal to the axis of rotation of the bit, both angles of inclination being constant along the length of the cutting edge. The path of movement of the cutting edge 13 is indicated at 14 and the penetration angle is indicated at 15. The "clearance angle" of the drill tip, that is the angle between the frontal face 12 of the tip and the path of movement 14 of the cutting edge, is indicated at 16 in FIGS. 1 to 3, FIGS. 1 to 3 show the penetration and clearance angles at radii (r) of $\frac{7}{8}"$, $\frac{1}{2}"$ and 3/16" respectively.

At the radially outer end of the cutting edge, shown in FIG. 1, $r = \frac{7}{8}$ inch and the penetration angle is approximately 3°. There is thus a clearance angle of 14° and an effective rake of 6°, while at the inner end, shown in FIG. 3, where r = 3/16 inch and the penetration angle is approximately $14\frac{1}{4}°$, the clearance angle is $2\frac{3}{4}°$ and the effective rake is $17\frac{1}{4}°$.

At an intermediate position, shown in FIG. 2, where $r = \frac{1}{2}$ inch, the penetration angle is approximately $5\frac{1}{2}°$, the clearance angle is $11\frac{1}{2}°$, and the effective rake is $8\frac{1}{2}°$.

The "effective rake" is the angle at which the leading face 11 is inclined to a plane normal to the path of movement 14 of the cutting edge 13.

It is possible, in accordance with the invention, to reduce these variations in clearance angle and effective rake along the length of the cutting edge and thereby to attain a uniform small rake and a uniform small clearance angle at the given drilling rate and running speed. This in turn makes possible the adoption of a large included angle for the tip, approaching 90°, and hence a considerable improvement in the strength of the drill bit.

In a first embodiment of the invention shown in FIGS. 4 to 8, a rotary drill bit has a tip 17 of included angle 88° which is uniform along the length, or the major part of the length, of each of the cutting edges, with a uniform clearance angle of 2° and a face of neutral rake (i.e. the leading face being normal to the path of movement of the cutting edge) when cutting at the given speed.

Figure 8:
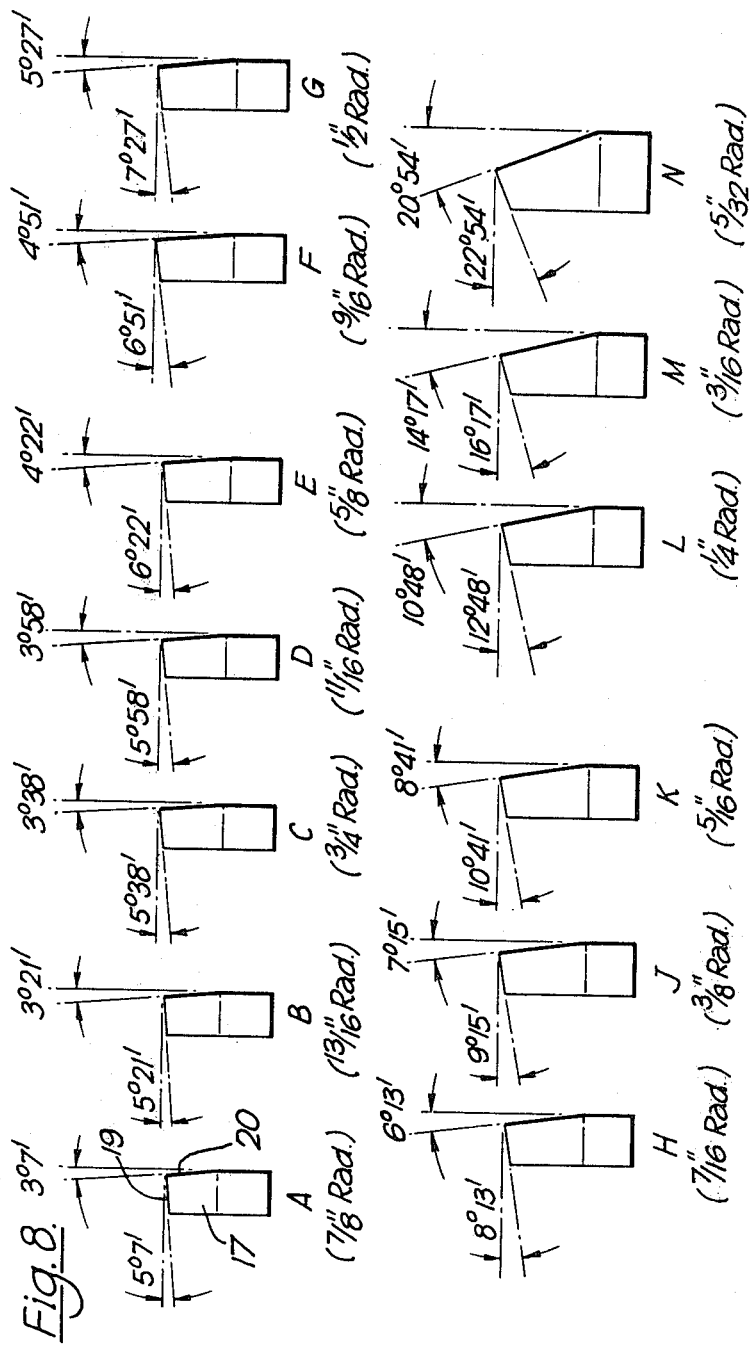

In the case of a drill bit of 1¾ inches diameter for the drilling rate and running speed already quoted, the tip 17 has two radial cutting edges 18, opposite and oppositely inclined, each edge 18 being defined by a frontal face 19 intersecting a leading face 20 of the tip, the included angle being 88° throughout the length of the edge. FIG. 8 comprises sectional views of one half of the tip 17 at locations A to N along the length of the cutting edge 18, and shows the angles of inclination of the frontal face 19 and leading face 20 at the different locations.

The inclinations of both faces decrease progressively and by equal amounts with the radial distance along the cutting edge from the axis of rotation of the drill tip. The inclination of the leading face is made equal to the angle of penetration, the tangent of which is $0.3/2\pi r$, at all points along the length of the cutting edge, so that in use, at a given speed and drilling rate, the leading face is normal to the path of movement of the cutting edge, i.e. is of neutral rake. The inclination of the frontal face, at each point along the cutting edge, is 2° greater than the corresponding angle of penetration, thus providing a uniform 2° clearance angle.

The large included angle of 88°, i.e. approaching a right angle, which is maintained along the length of each cutting edge, results in a tip of greater strength than realised hitherto in rotary bits. The large angle cannot however be usefully maintained at very small radii close to the axis of the bit and a cut-out 21 is therefore provided at the nose of the bit to separate the two cutting edges and limit their length. A cutting edge of an angle of 90° is formed in the cut-out to break away any coring which may occur in use. In practice however nearly all rock is sufficiently friable to break away between the two main cutting edges. In the embodiment shown in FIGS. 4 to 8, where the tip has a diameter of 1¾ inches, a cutout of ¼ inch diameter is provided, but larger cut-outs of width or diameter up to TM inch or more may be adopted.

The described drill tip is, in use, incorporated in known manner on a drill bit having a portion shaped, in accordance with existing practice, for coupling to a drill rod.

In the embodiment described above in relation to FIGS. 4 to 8, the tip is of flattened form with a width of ⅜ inch transverse to the cutting edges and frontal faces of 3/16 inch trailing from the corresponding cutting edges. At the outer ends of the cutting edges, the tip preferably conforms to the cutting circle of 1¾ inches diameter.

It will be appreciated however that the dimensions and outline shapes are given only by way of example and that the invention may be applied to determine the cutting angles in any of a wide variety of rotary drills for various purpose.

FIGS. 9 to 12 show a drill tip 22 for use in the rotary drill bit of FIGS. 13 to 15, where two such drill tips are mounted on a body portion 23 shaped for coupling to a drilling rod, so that the two opposed cutting edges 24 extend outwardly away from the axis of rotation of the drill bit on opposite sides thereof. FIG. 12 comprises sectional views of the tip 22 at the locations A to N (indicated in FIG. 9) along the length of the cutting edge, and shows the angles of inclination of the frontal face 25 and leading face 26 at the different locations.

The angles of inclination of the two faces are such that, at a drilling rate of 10 feet per minute when running at 400 rpm, the leading face is of neutral rake and the clearance angle is 2° at all points along the length of the cutting edge.

FIGS. 16 to 18 are similar views to FIGS. 9 to 11 of an alternative shape of drill tip 27 having a cutting edge 28, a frontal face 29 and a leading face 30. Again the angles of inclination of the frontal face and leading face are as shown in FIG. 12, so that, at the drilling rate and speed mentioned, the leading face is of neutral rake and the clearance angle is 2° at all points along the length of the cutting edge. FIGS. 19 to 21 are similar views to FIGS. 13 to 15 and show two drill tips 27 of the kind shown in FIGS. 16 to 18 mounted on a body portion 38 shaped for coupling to a drilling rod.

What I claim is:

1. A rotary drill bit including a drill tip having a frontal face, inclined with respect to a plane normal to the axis of rotation of the bit, a leading face, inclined with respect to a plane containing the axis of rotation of the bit, and a cutting edge extending outwardly away from the axis of rotation and defined by the intersection of said frontal face and said leading face, the angles which said frontal and leading faces make with said planes respectively both decreasing as said faces extend away from the axis of rotation of the bit, the decrease in the angle of said frontal face being such that the angle between the frontal face and the path of movement of the cutting edge, for a predetermined rotational speed and drilling rate, is substantially the same at all points along the length of the cutting edge, and the decrease in the angle of said leading face being such that, for the same predetermined rotational speed and drilling rate, the leading face is normal to the path of movement of the cutting edge at all points along the length of the cutting edge.

2. A rotary drill bit according to claim 1, wherein the angle between the frontal face and the path of movement of the cutting edge is substantially 2°.

3. A rotary drill bit according to claim 1 wherein there are provided two opposed cutting edges extending outwardly away from the axis of rotation of the drill bit on opposite sides thereof.

4. A rotary drill bit according to claim 3 wherein a cut-out is provided at the nose of the bit to separate the two cutting edges.

5. A rotary drill bit according to claim 1 wherein the drill bit is integral with a drilling rod.

6. A drill tip for use in a rotary drill bit and having a frontal face, inclined with respect to a plane normal to the axis of rotation of the bit, a leading face, inclined with respect to a plane containing the axis of rotation of the bit, and a cutting edge extending outwardly away from the axis of rotation and defined by the intersection of said frontal face and said leading face, the angles which said frontal and leading faces make with said planes respectively both decreasing as said faces extend away from the axis of rotation of the bit, the decrease in the angle of said frontal face being such that the angle between the frontal face and the path of movement of the cutting edge, for a predetermined rotational speed and drilling rate, is substantially the same at all points along the length of the cutting edge, and the decrease in the angle of said leading face being such that, for the same predetermined rotational speed and drilling rate, the leading face is normal to the path of movement of the cutting edge at all points along the length of the cutting edge.

* * * * *